United States Patent [19]

Lienau

[11] Patent Number: 5,150,099
[45] Date of Patent: Sep. 22, 1992

[54] HOME SECURITY SYSTEM AND METHODOLOGY FOR IMPLEMENTING THE SAME

[76] Inventor: Richard M. Lienau, 1236 Wellesley Ave., #1, Los Angeles, Calif. 90025

[21] Appl. No.: 554,407

[22] Filed: Jul. 19, 1990

[51] Int. Cl.$^5$ .................. G08B 13/18; G01S 13/00
[52] U.S. Cl. .................. 340/552; 342/27; 364/564; 367/93
[58] Field of Search .............. 340/552–554; 367/93–94; 342/27–28, 44; 364/564

[56] References Cited

U.S. PATENT DOCUMENTS

| | | | |
|---|---|---|---|
| 3,665,443 | 5/1972 | Galvin | 367/94 |
| 3,882,494 | 5/1975 | Bolger | 340/554 X |
| 4,001,771 | 1/1977 | Amrine et al. | 340/566 X |
| 4,028,690 | 6/1977 | Buckley et al. | 340/552 |
| 4,197,537 | 4/1980 | Follen et al. | 340/552 X |
| 4,286,260 | 8/1981 | Gershberg et al. | 340/554 |
| 4,382,291 | 5/1983 | Nakauchi | 367/93 |
| 4,639,902 | 1/1987 | Leverance et al. | 367/93 |
| 4,684,932 | 8/1987 | Kupec et al. | 340/564 |

*Primary Examiner*—Jin F. Ng
*Assistant Examiner*—Thomas J. Mullen, Jr.
*Attorney, Agent, or Firm*—Daniel L. Dawes

[57] ABSTRACT

A home security detection system, incorporating an antenna phasing system for transmitting signals and receiving return signals, and computer software driven circuitry identifies specific characteristics of both stationary and movable objects in a monitored area to obtain a template. The system activates an alarm or interacts with other external alarm systems when the absence or presence of certain object-characteristics are identified as abnormal as compared to the template.

20 Claims, 8 Drawing Sheets

(1) $1/d^2$
(2) $M/d^2$
(3) $R = M/d^2$
(4) $\tan A = \dfrac{R_1 - R_2}{U}$
(5) $M = Rd^2$
(6) $M = R_1 d_1^2$
(7) $M = R_2 d_2^2$
(8) $R_1 d_1^2 = R_2 d_2^2$
(9) $d_1 = \dfrac{\sqrt{U^2 \tan^2 A + R_1 U \tan A + R_1 + R_1}}{\tan A} - U$
(10) $d_1 = \sqrt{M/R_1}$

HOME SECURITY SYSTEM AND METHODOLOGY FOR IMPLEMENTING THE SAME

BACKGROUND OF THE INVENTION

1. Field of the Invention

This invention relates to home security systems capable of distinguishing intruders from permitted occupants and methods of operation for the same.

2. The Prior Art

The use of both Doppler and non-Doppler ultrasonic and electromagnetic detection systems is well known.

Bolger, *"Doppler Correction Radar Providing Combined Target Detection and Ranging"*, U.S. Pat. No. 3,882,494, is directed to a ranging type device which provides for the transmission and reception of signals to provide a signal from a moving target. The observer listens for an audio frequency which is indicative of the Doppler frequency signature of a moving target within a course/range subinterval. The presence of a moving target is detected as a low volume, Doppler frequency, signature signal. The fine range of the target is then selected in a particular range bin which results in a Doppler frequency signature signal. Bolger requires the active intervention of a human operator in the distance determination.

Greer, *"Magnetic System for Discrimination Between Vehicles and Personnel Based upon their Characteristic Frequency Signatures"*, U.S. Pat. No. 3,889,181, is directed to a system which includes a low pass and a high pass filter adapted to pick up personal magnetic signatures on one hand, and vehicle magnetic signatures on the other. Greer performs his detection and classification function on the basis of signal amplitude and frequency content. Classification on the basis of frequency content is possible by virtue of spectral characteristics which differ between vehicles and personnel magnetic signatures. Personnel, carrying metallic objects, generate frequency on the order of a few tenths of a Hz., while vehicles generate frequencies from a few tenths of a Hz. to more than one Hz. Because of the overlap between vehicle and personnel magnetic signatures, higher frequency components, arising from the rapid mechanical motion of various mechanical vehicular parts, are detected to make the distinction between personnel and vehicles. The bandwidth for vehicular motions of this type are in the range of 6 to 40 Hz. By designing a system to process these two frequency ranges, a highly effective classifier is realized since personnel will generate signatures only in low frequency ranges, and vehicles will always generate signals in both ranges. Greer does not memorize a characteristic range of signatures, but simply looks to signals at various spectral subintervals. Greer's system, for example, has no capability of distinguishing a normal movement from an abnormal one, as is necessary for an alarm.

Gershberg et al., *"Ranging Quadrature Doppler Microwave Intrusion Alarm System"*, U.S. Pat. No. 4,286,260, shows an intrusion alarm system which includes signal channels for quadrature processing wherein different types of sideband techniques are used to enhance what are termed legitimate and true signals over false alarm signals. Gershberg's alarm system attempts to control the effective range of the intrusion alarm system to minimize nuisance alarms caused by targets moving outside of the desired protected area. Ranging, according to Gershberg, is achieved by establishing a time window within the system which responds to a returning echo. Any signal received outside this time window is rejected by the system. The time window is established such that a target within a specified range limit will return an echo before the time window expires. The signal is subject to quadrature and processing to discriminate against double sideband signals produced by vibrating reflective objects, and to enhance the single sideband signals produced by intruders within the specified range limit. Thus, Gershberg has a discriminating circuit which identifies abnormal signatures over normal ones by processing the transmitted and received signal to limit the geographic range of the intrusion. Gershberg is not capable of distinguishing allowable moving masses from intruders.

Nakauchi, *"Surveillance System in which a Reflected Signal Pattern is Compared to a Reference Pattern"*, U.S. Pat. No. 4,382,291, uses an ultrasonic element controlled by a transmitter circuit. The ultrasonic waves from ultrasonic element 1 are reflected by various objects and received again by the ultrasonic element. The reflections are converted into digital signals by circuit 3 and transmitted to the operation processing circuit 4. The operation processing circuit 4 prepares a reference pattern in advance based on patterns and reflections collected by receiver circuit 3. When the area under surveillance is monitored, the pattern of reflections responsive to conditions in the area under surveillance is then compared to the reference pattern. When the two patterns are different, operation processing circuit 4 energizes alarm 5.

Although Nakauchi specifically refers to ultrasonic waves in the illustrated embodiment, electromagnetic waves and optical energy are suggested for alternative detection beams. Nakauchi is not capable of allowing normal, allowable movement without energizing alarm 5.

Follen et al., *"Intruder Detection System"*, U.S. Pat. No. 4,197,537, is another example of a system which senses, stores and compares sense signals against a reference. Follen particularly uses a microwave radiation which is spherically radiated from a single point source into space to illuminate or "paint" a secured area with a narrow ring of radiated energy of growing radius. As the radiated energy intersects objects in the predetermined range, signals are reflected back to a receiver and converted into a signal pattern representing the reflected pattern within one or more range rings of the secured area. The reflected pattern of the area, or a selected portion thereof, establishes a norm, which is recalled and periodically compared with future signals from the same area. A special automatic gain control and sign processing circuit establishes an ambient or reference signal, and this circuit in combination with comparison logic provides a basis for future signal comparison. Follen's system thus operates without generating nuisance alarms in an environment where objects, although locally fixed, exhibit limited motion. Any movement greater than a predetermined allowable limited movement, whether "normal" or "abnormal", would generate an alarm signal in Follen's system.

Terrell et al., *"Electromagnetic Intrusion Sensor"*, U.S. Pat. No. 4,054,871, is directed to a Doppler type electromagnetic intrusion sensor. The signal is generated in transmitter 10 and a portion of the signal is then reflected from target 20 and returned to the receiver. The reflected signal 24 is then mixed with the transmitted signal 22 and when target 20 is in motion a Doppler signal is produced. This signal is amplified, filtered and fed into a signal processor 18 which produces an alarm output 19 when information indicates the presence of an intruder. Terrell shows the general concept of a Doppler type radar, giving an alarm signal responsive to an abstract signature comparison. Terrell detects moving objects, but does not have the ability to distinguish allowable moving objects from intruders.

Galvin, "*Ultrasonic Intrusion Alarm*", U.S. Pat. No. 3,665,443, exploits the phenomenon that the spectrum caused by an interfering phenomenon, such as air turbulence, is symmetrically arranged about the carrier frequency of the transmitted signal. The spectrum and the signal attributable to an actual target is in contrast asymmetrical with respect to the carrier frequency. If the spectrum of the received target is unbalance by a predetermined amount with respect to the carrier, an alarm will be produced.

Johnston, "*Radar Target Identification System*", U.S. Pat. No. 3,733,603, shows an automated recognition computer 13 connected to line 2. Computer 13 is coupled to a display device 14. Johnston indicates that vehicles may be discriminated from other targets due to differences of the scintillation frequencies and body motion frequencies of the objects. Echoes from radar targets have been found to be modulated in amplitude as a result of three types of target motion, normal trajectory motion, body motion and other motions. Trajectory motion is due to aeroballistic effects and missile attitude programming. Body motions include the effects of wind gusts, guidance maneuvers, corkscrewing, nutation and the like. "Other effects" is meant to include missile spin, effects of air brakes and configuration changes. All of these phenomena represent radar signatures indicative of missiles. The above modulations or scintillations of radar signals can be processed and appropriately utilized to obtain useful target identification. Although Johnston is not simply identifying "an intruder" but is capable of discriminating a normal intruder from an abnormal one, this identification is based upon repeatable and distinguishable frequency differences in a very narrow class of targets, namely missiles in flight.

Buckley et al., "*Intruder Detection Device*", U.S. Pat. No. 4,028,690, is directed to an electromagnetic intrusion system in which the receiver signal is sensed at predetermined intervals of time, and an alarm is initiated only when a change in any one of the predetermined intervals exceeds a predetermined amount. As a consequence, permanent changes in signal level are insufficient to cause a comparative output and are effectively removed over a period of time. Such small changes can be caused by slow alterations of the transmitted signal, or may arise from environmental reasons such as temperature changes or weather conditions which alter the attenuation of the signal path. However, signal changes caused by intrusion of the human being into the protected zone, consisting of an area between the transmitter and receiver, tend to be of a greater magnitude and of shorter duration than those occurring due to environmental causes. Thus, Buckley generally shows an electromagnetic intrusion system in which the reference signal discriminates slow-moving or slowly changing intruders as normal against more quickly moving intruders as abnormal.

What is missing from each of the references, singly and in combination, is any type of apparatus or methodology which is capable of retaining a time dependent reference template which contains information concerning moving objects, as well as stationary objects, within a monitored area.

Home security systems of the type using the technology disclosed in the references are, therefore, limited by their inability to distinguish between a normal, acceptable moving presence and a non-acceptable moving intrusion in a monitored area.

In a typical home there is constant movement. Members of the family, pets, delivery men and others are all expected to move about the house in certain areas at certain times.

Any security system was heretofore incapable of distinguishing the aforementioned acceptable and normal household activity from abnormal movement which would indicate an unknown and unwanted intruder's being present in a given area. For instance, in a family consisting of a 190-lb. father, a 120-lb. mother, a 70-lb. child and a 30-lb. dog, the presence of a 165-lb. moving object in the living room at 3:00 a.m. should be determined by a security system to be an abnormal presence which would cause an alarm condition to exist. However, the presence of the family dog in the living room at 3:00 a.m. should not warrant the sounding of an alarm.

As shown in the previous example, a security system which can distinguish between normal, acceptable movement and abnormal movement would be of tremendous benefit. Such a system would not sound a "false alarm" in the event of normal and allowable movement within a monitored area. The savings in time and money of not having to respond to "false alarms" are numerous and obvious.

Thus, there is a need for a home security system which instantly and automatically determines that an object (intruder) is present in a given area.

There is further need for such a system to distinguish between a normal authorized moving presence and an abnormal unauthorized intrusion.

There is further need for such a security system which can communicate with outside systems, such as alarms, to notify and/or alert the appropriate system or person to take appropriate action if an unauthorized intrusion occurs.

BRIEF SUMMARY OF THE INVENTION

The present invention is a home security system which determines the presence of an unauthorized object within a monitored area using information obtained by transmitting electromagnetic energy waves into the monitored area and by sensing the amplitude of those energy waves as they are reflected or refracted off objects within that monitored area.

Information about the objects within the monitored area is generated by the system using the sensed refracted energy wave amplitudes, which are digitized and processed through a computer programmed with system-specific algebraic equations and algorithms.

This system-specific computer program (MRDOT program) is capable of defining the ambient stationary surroundings, which is not novel for systems of this type.

However, unlike other systems of this type, the MRDOT program is further capable of calculating the approximate cross sectional area of an object moving about within the monitored area.

During a template-formation phase, the system first forms a template containing a digital representation of the ambient surroundings (all stationary objects) within a monitored area. The system then includes in the template a digital representation of the cross-sectional area of any bodies predetermined to be authorized within the area.

During an operation phase, the system continuously generates information about all the objects in the monitored area, and compares the present status of objects within the monitored area with the previously formed template.

The results of those comparisons produce an alarm condition if more than minimal variations are found. Minimal variations are predetermined by the user to be those which are created by bodies having an insignificant cross sectional area (i.e., birds, bugs, etc.) or objects having limited movement (leaves rustling in the wind, the grandfather clock, etc.)

A further feature of this system is the ability to change the template by informing the MRDOT computer, via a thumbwheel or the like, that a moving body having a specific cross sectional area has entered or exited the monitored area.

DETAILED DESCRIPTION

Figure 1:
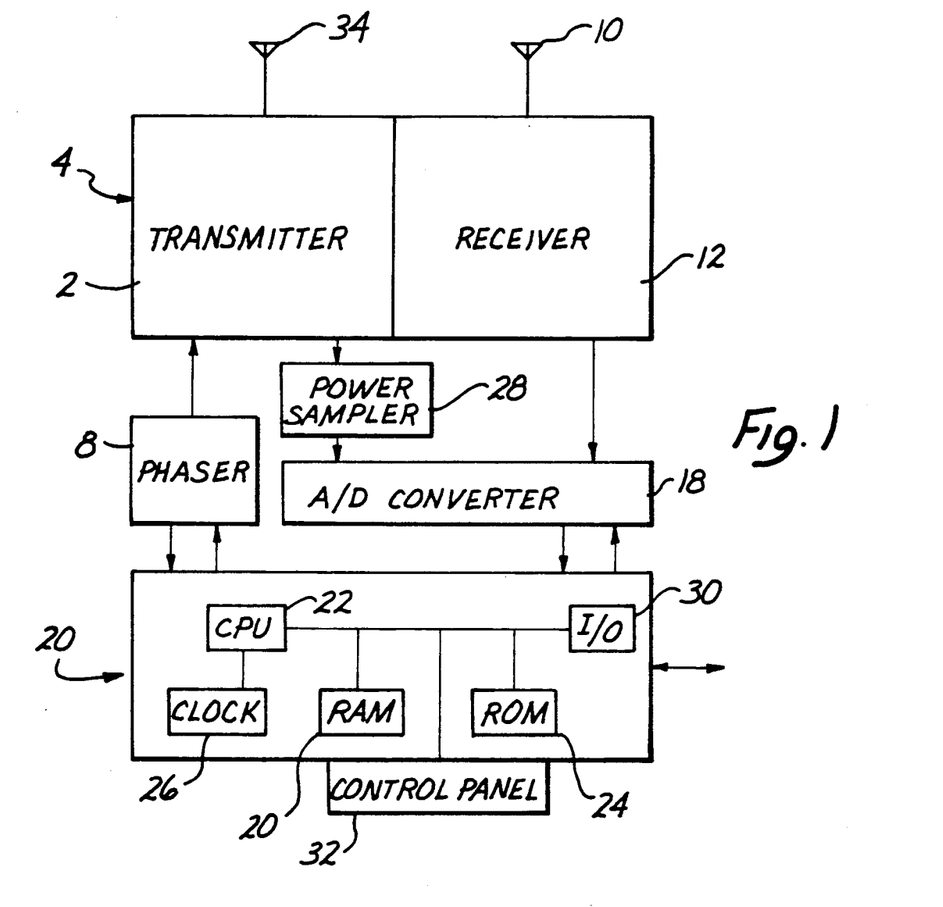
FIG. 1 is a block diagram of the invention.

Reference is here made to FIG. 1. Electromagnetic energy is transmitted via high frequency radio waves of constant frequency and amplitude which are broadcast from the transmitter 2 portion of the transceiver 4 in a plane circular pattern over a monitored area 6, shown in FIG. 2. A phased antenna technique is employed which effectively transmits the radio waves in a predetermined number of equal angular segments about a 360 degree circle around the transceiver 4 by way of phaser 8. A closely coupled receiver antenna 10 feeds the refracted radio wave signals to a receiver section 12 which detects phased sensitive changes of amplitude in the radio wave signals when an object 14 intrudes into monitored area 6 and crosses the wave fronts 16 of the transmitted signal.

Information representing the amplitude of the refracted signals is digitized in analog-to-digital converter 18 and sent to computer 20. Information concerning the effective transmission of each segment of radio waves, including its amplitude and angle of transmission, is tracked in digital form and, after being temporarily stored in computer RAM 20, is available to a microprocessor 22 along with the digitized refracted signal information for processing.

The algorithms stored in the computer's ROM section 24 enable it to calculate the distance of the object 14 from the transceiver 4, the direction in which it is moving and its speed. The time and duration of the object's presence within each angular segment is also tracked by the CPU 22 using input from a clock. This system can be used to detect the presence or absence of identified moving masses over a given area.

Using the aforementioned available information, the system's CPU 22 compares the signature electromagnetic cross section of a monitored object with predetermined allowable electromagnetic cross sections stored in a template and it effects electronic notification to other systems if unauthorized objects are detected. In addition to the electromagnetic detection system, CPU 22 can also monitor conventional thermal, ultrasonic and mechanical alarm systems.

A further feature of the invention includes the ability of the system to continuously operate effectively in the event of fluctuations in the power output of the transmitter 2. It is necessary for CPU 22 to receive precise digitized information concerning the power output of the transmitter 2 at all times in order to correctly calculate the electromagnetic cross section of a target object. A feedback system incorporating a power sampler 28 is therefore utilized which informs CPU 22 of the time and amount of any power fluctuations. Adjustments are then made to accurately calculate the electromagnetic cross section of the target object taking into consideration the power fluctuations.

Clock 26 is a crystal-controlled clock running at about 5 Mhz and is coupled to CPU 22. Through an address bus, CPU 22 calls for programmed instructions from the ROM 24, a read-only memory, which arrive over a data bus. It also controls the operation and timing of five different input/output peripherals. Through a control line, RAM/NOT ROM, addressing to RAM 20 and ROM 24 is controlled. Data to be processed is acquired from I/O block 30, digitizer 18, and control panel 32. Data is sent over a data bus to phaser block 8, control panel 32 and RAM 20.

RAM 20 is a high-speed random-access memory needed for storing all data incidental to the operation of the system. Data for the truth table, search data coming in from digitizer 18, power sample digitizer 22, control panel 32 and I/O block 30 are stored in RAM 20. Comparison data is retrieved from RAM 20 as well.

Control panel 32 contains all of the switches and lamps necessary to communicate with the operator of the system. Switch functions, such as START, STOP and ENTER, as well as codes entered through data input switches, are all converted to digital byte form for transmittal along a data bus to CPU 22. Information from CPU 22 which arrives on a data bus is converted from digital byte form to specific indication through lamps in byte registers or other transducers.

Transmitter section 2 is an analog device utilizing a high-frequency oscillator. The main tank circuit is in the collector circuit, comprising a "T" type arrangement with a Johansson capacitor in the leg of a T-type antenna feeder circuit. The antenna 34 is a single-ended dipole. The transmitter 2 operates at an FCC-approved frequency of approximately 915 Mhz.

Phaser 8 is a digital byte-driven device which controls the directional output of the transmitting antenna 34. Stepped counts in byte form arrive on the data bus from CPU 22 and are converted to a signal which biases the signal phase of the transmitted RF sine wave so that the beam is effectively swung in a 360-degree pattern in even steps.

In a single-phase antenna environment, that is, wherein the transmitter radiates its energy in a more or less 360-degree pattern, this system can determine the mass, distance and apparent speed of a free body moving within its purview, but it cannot calculate the position of the free body in the plane of the area covered, and thus the actual position relative to the transceiver. To do so, the system requires plane position information. To that end, an antenna phasing system provides vector information by swinging a narrow, or focused beam of the transmitter's radio frequency through an arc from zero to 360 degrees.

Figures 3, 4, 6:
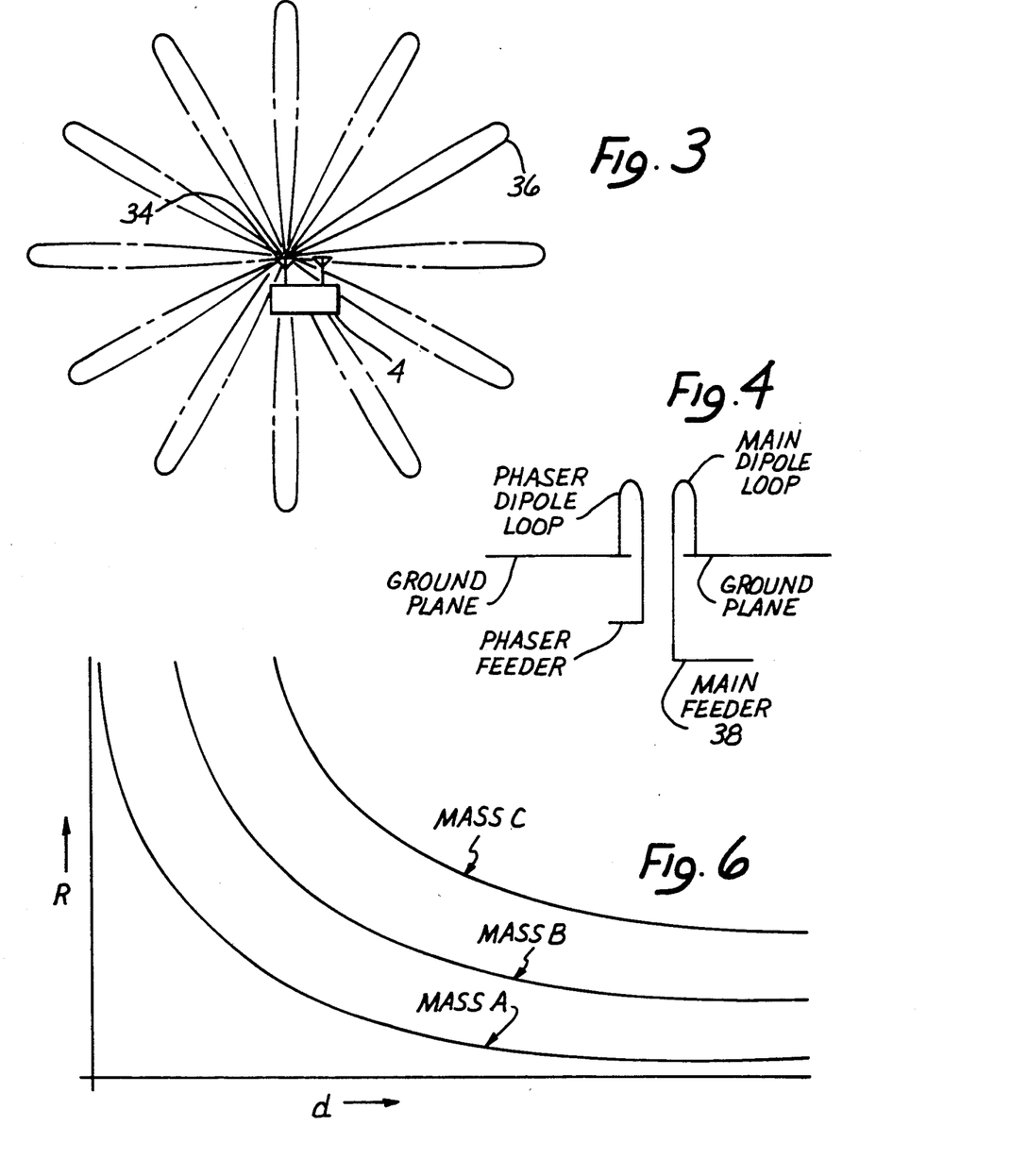
FIG. 3 illustrates a single radio frequency lobe emanating from the transceiver antenna.
FIG. 4 illustrates the hardware and theory used to send a phased signal into the monitored area.
FIG. 6 is a graph plotting the return signal against the distance from transceiver of several different masses.

The antenna is designed such that a narrow lobe 36 of RF energy is transmitted for every one of 360 degrees of arc (see FIG. 3). Electronic circuitry is provided in phaser 8 to move the RF lobe 36 from position to position without mechanical means (see FIG. 4). The continuous-wave RF energy from the transmitter section 2 is fed to a main antenna and a certain amount of RF energy of the same frequency is fed from the transmitter section 2 to a series of physically close secondary antennae, depending upon the direction of the lobe, and out of phase with the main feed in such a manner as to cause the distortion of the wave into a narrowly focused and directed lobe 36 (see FIG. 3).

As the lobe 36 is directed through the planar arc, CPU 22 is notified of each degree of directional arc by way of the digitizer 18 through RAM 20 such that the CPU 22 is provided with the direction at which the lobe 36 is pointed for each transmission interval. Data will then be stored in RAM 20 for each sector of arc. As a free body or mass 14 moves across the planar purview of the transceiver 4, it will calculate the vector and therefore the true planar position and speed of the body 14 relative to the transceiver 4.

In this way, too, the field 6 of the transceiver 4 may be mapped. For example, the outline of a dwelling may be described to the computer, so that it can determine the position of a free body 14 within or without the limits of the dwelling.

The receiver section 12 is an analog device. It is comprised of a rigid dipole "stinger" antenna 10 closely-coupled to the transmitting antenna 34. Its output is fed to a preamplifier and an amplifier, smoothed, and then fed to digitizer 18. The receiver antenna 10 is physically located less than a quarter-wavelength away from the transmitting antenna 34. An L-tank circuit, connected at the eighth-wave node point on the antenna 10, whose tuning capacitor is a Johansson capacitor, feeds the anode of a detector hot-carrier diode whose output is low-pass filtered. The resultant DC signal is fed to the base of an NPN transistor, 2SC373. The base circuit has been modified so that the bias transistor is a 5K ohm potentiometer. This transistor is connected as an emitter-follower whose output feeds eventually to the digitizer 18.

A free-moving body or mass 14, introduced into the field 6 of the transceiver 4 will add refracted RF energy to that already present due to reflections and refractions in the static surroundings of the transceiver 4. As the free mass 14 approaches the transceiver 4, the DC output of the receiver 12 will rise and fall at an increasing rate as the body crosses the standing wave node boundaries 16 set up in the monitored area.

The digitizer 18 for the receiver section 12 comprises circuitry (see FIG. 9) which converts smoothed analog signals to digital byte form representing their amplitude, for transmission onto the data bus of the computer 20.

Since it is possible for the power, measured in watts, of transmitter 2 to shift, that is, rise or fall, during operation due to external electrical power aberrations, the actual power of transmitter 2 is tracked by the system and this information is used to alter the received data accordingly in order to maintain accuracy of the system.

Power sampler 28 is a feedback sensing circuit which constantly reads the output power of transmitter 2. This circuit 28 outputs its data to digitizer 18 for digital data reduction. This data is transmitted along with every received data packet cycle to the computer 20 where it is tracked and used to normalize the received information, thus keeping the overall received data linear. This is done to ensure that readings from receiver 12 are adjusted up or down to compensate for any power drift of transmitter 2 so that calculations are accurate.

Digitizer 18 is comprised of circuitry (see FIG. 9) which converts smoothed analog signals to digital byte data to be transmitted on a data bus to CPU 22 for use in search calculations.

I/O section 30 consists of circuitry which transmits and receives byte data. Incoming analog data from outside devices such as alarm systems, temperature senders, clocks, code locks and the like are converted to digital data. An interrupt signal to CPU 22 notifies it that there is data to be handled, and the incoming data is provided from the data bus to CPU 22 for use in the system functions. Outgoing data from the system is converted to analog signals to sound alarms, indicate status and so on.

ROM 24 stores all of the software routines to run the system. However, although not shown on the block diagram, the system has a battery backup system that under normal circumstances should "hold the system up" during an AC power outage.

Figure 9:
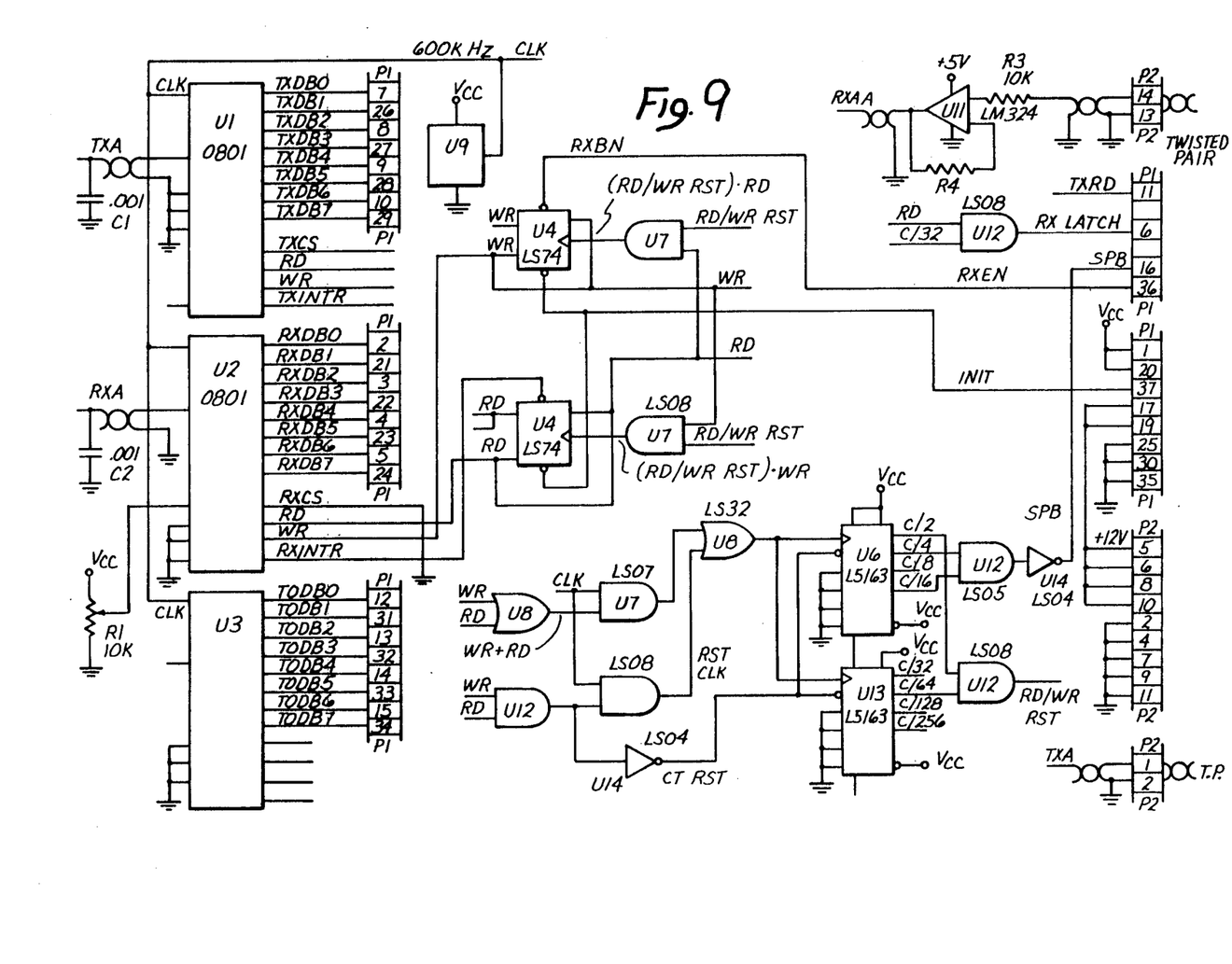
FIG. 9 is a circuit diagram of an analog-to-digital conversion control indicating the circuitry used in a preferred embodiment within the digitizers shown in FIG. 1.
Figure 11:
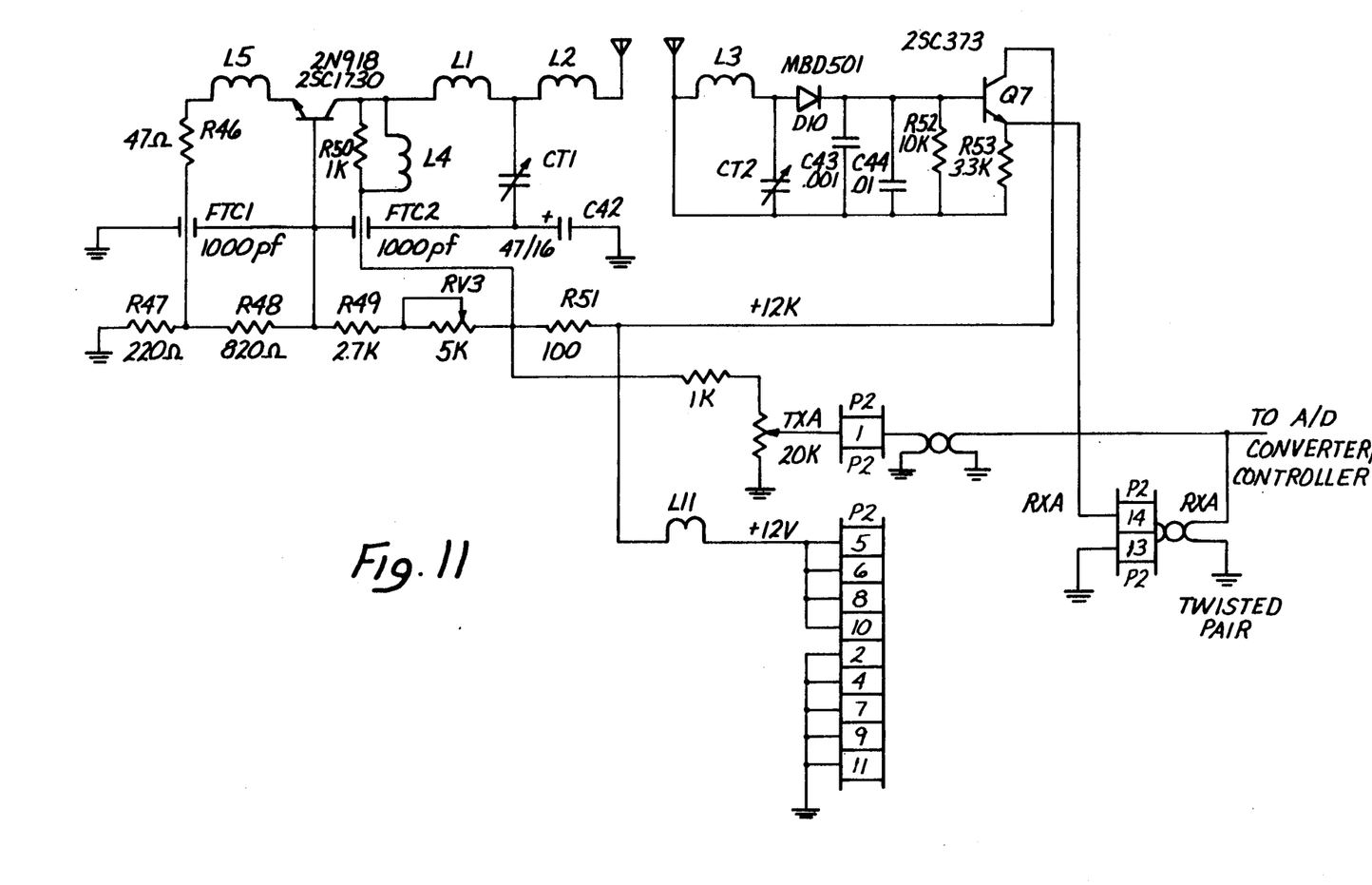
FIG. 11 is a circuit diagram indicating the preferred embodiment of the circuitry within the transceiver circuit shown in FIG. 1.

Turn to FIG. 9. A low voltage, low-frequency A/C-modulated D/C signal enters the analog-to-digital conversion circuit 18 (see FIG. 9) at pin 14 of connector P2 as one half of a twisted pair to aid in spurious noise rejection. This signal is termed RXA, or Receive Analog, and is the output from the 915 Mhz mass-detection transceiver. See FIG. 11. RXA is amplified by U11, an LM 324 operational amplifier, although other amplification techniques could be used. The output of this amplifier circuit is termed RXAA, and is fed to pin 6 of U2, an 801 A/D chip. This chip is driven by clock pulses, CLK, derived from U9, and 8640A square-wave clock generator, operating at 600 Khz in this example, and 5 volts (Vcc). RXAA is compared with the D/C voltage tapped off potentiometer R1, a divider between Vcc and Gnd, which is fed to the 801 chip via pin 9, as Vref/2. This effectively sets the correct voltage range for the incoming RXAA signal against Vcc.

Four control signals determine the operation of the 801, RXCS* (the asterisk denotes an active negative signal), to pin 1, RD* to pin 2, WR* to pin 3, and RXINTR*, to pin 5. RXCS* is the chip select term, and is pulled down all the time, meaning that U2 is always selected. The RD* and WR* terms determine the periods during which the 801 chip will digitize the incoming RXAA signal and load the resultant data onto the data bus, RXDB0 through RXDB7. The RXINTR* term is used by the A/D converter chip to notify the ancillary circuitry that it has completed its conversion and is ready for data read operation.

When power is initiated, it is assumed that A/D circuitry 18 is not reset and thus may be in a chaotic condition. To start the circuitry properly, therefore, computer 20 (not shown, but assumed here) transmits a signal termed INIT* (see FIG. 10), as interpreted by U2, the P16L8 PAL, via P1 pin 37. INIT* is fed to the Reset Pins 1 and 13 of U4, and LS74 flip-flop, the Read and Write control circuits, pulling them to reset. When this occurs, the WR and RD terms will go low, and the WR* and RD* terms will go high, or to the inactive state. With this reset forced by the initializing term, U2, the A/D chip, although selected, is inactive, with no conversion being performed and no data loaded onto the output bus. With RD* and WR* high, the AND circuit in the LS08, U12, Pins 1 and 2 are driven high, bringing the output pin, 3, high. Thus pin 13 of U7, another LS08 AND circuit, is driven high, and, along with pin 12, the CLK term, forces its output, pin 11, RSTCLK, to toggle at the clock rate. RSTCLK is fed to pin 2 of the OR circuit, U8, an LS32, whose output, pin 3, CT, drives pin 2 of U6 and U13, the LS163 counter chips. This, in combination with CTRSRT*, Counter Reset, developed from the U12 pin 3 term WR*+RD* and inverted by the LS04 at U14, to drive the number 1 Pins on both U6 and U13, causes these counter chips to be held reset. Thus, A/D circuit 18 is effectively inactive.

A/D circuitry 18 is passive, since computer 20 forces its reset, read and data transfer cycles. Some time after INIT*, therefore, computer 20 transmits a signal termed RXEN*, Read Enable, through the interpreter chip at U2 in the I/O circuit (see FIG. 10), via P1 36, into A/D circuitry 18 (see FIG. 9). RXEN* pulls pin 4 of U4 down to set the flip-flop, thus bringing WR high and WR* low, to their active states.

A/D circuit 18 is now in the Write mode, during which time the A/D converter will perform the analog to digital conversion. The WR term is felt on pin 4 of the OR circuit at U8. Its output term, pin 6, is fed to pin 10 of U7, an AND circuit, and combined with the CLK term. The resultant term, a 600 Khz square wave clock, (WR+RD).CLK, is fed to U8 pin 1. This OR circuit feeds pin 2 on both the serially connected LS163 counter chips at U6 and U13 with the term CT, and they begin counting at the clock rate. After 18 clock pulses, the AND circuit output at U12 pin 11 is driven high. This term is inverted in U14, through Pins 3 to 4, to generate the term SPB*, Set Poll Bits. SPB* is sent via P1 16 to the I/O circuitry (FIG. 10), and pin 10 of U4. This pull-down sets the flip-flop, so that pin 9 goes high, placing Vcc on Pins 3 and 4 of U5, an LS373 octal register. Poll Bits will not be latched into the register at this time, however.

After sixty-six clock pulses, or about 110 microseconds after RXEN*, the RD/WR RST term is brought up at pin 6 of U12, an AND circuit, as the result of Pins 4 and 5 being toggled high by C/2 and C/64 respectively. RD/WR RST is fed to pin 1 of U7, an AND circuit. Its companion input pin, 2, is already high, since RD* is high. The resultant term drives pin 3, the clock term, on U4, the WR flip-flop. Since pin 2 of this same device is low with WR*, the flip-flop will reset with the rise of (RD/WR RST).RD*, bringing A/D circuit 18 out of the Write or conversion mode. This signals the A/D chip so that it can finalize conversion and prepare the digitized analog data for the data bus.

Shortly thereafter, the A/D chip toggles the A/D controller to the Read Mode by bringing RXINTR* low. RXINTR* pulls pin 10 of U4 down, thus setting this half of the flip-flop, bringing RD* low and RD high, or active. Between the rise of WR* and the fall of RD*, however, the counter chips at U6 and U13 were reset, as detailed above, as the result of WR* and RD* being high. With the rise of RD, the counter circuit starts again. And again, at clock 18, or approximately 13.3 us (microseconds), SPB* is sent to the I/O circuit. By this time, RXDB0-RXDB7 are loaded and stable. Therefore, both octal registers, U5 and U6 of I/O circuit 30 (FIG. 10), have data on their respective data input lines; Poll Bits (Binary 3), and digitized mass detector data. At time 32 of the counter, approximately 53.3 us, U12 pin 8 goes high, since the RD term on pin 9 is high already, generating the term RXLATCH. RXLATCH is sent via P1 6 to the I/O circuitry and to pin 11 of both U5 and U6, to latch in the data on the respective octal registers. At clock time 66, RD/WR RST is engendered as outlined above, and is combined with WR* at AND circuit U7 to reset the Read flip-flop at U4. The data on the bus drops, and the A/D circuit is again inactive.

Figure 10:
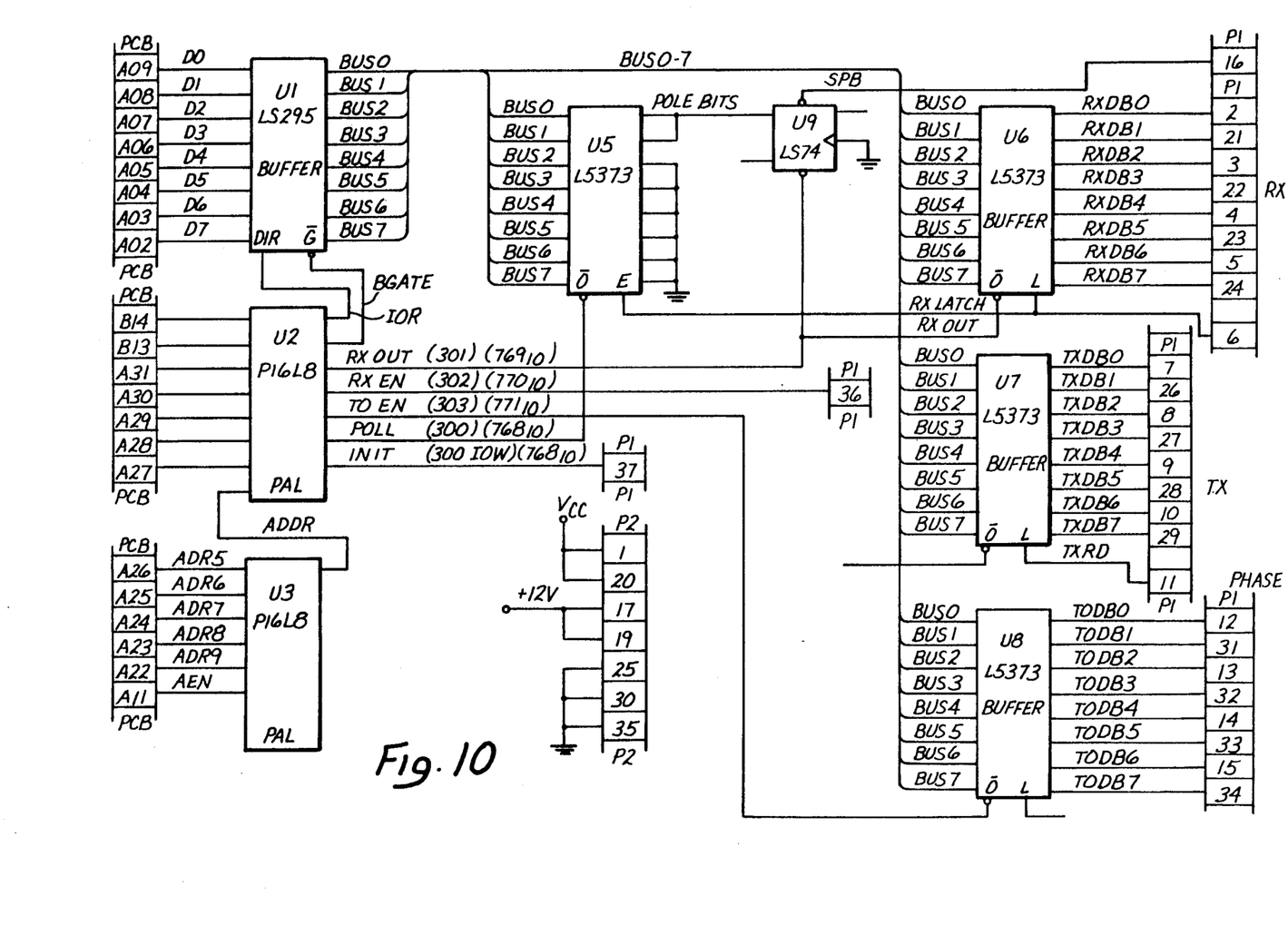
FIG. 10 is a circuit diagram indicating the preferred embodiment of the circuitry within the interface circuit shown in FIG. 1.

All this time since the transmission of RXEN*, computer 20 has been polling I/O circuit 30 with POLL*, to see if A/D circuit 18 has finished its conversion task. With the arrival of the next POLL*, fed to pin 1 of U5, a binary 3, Poll Bits, will be loaded onto the computer data bus and read by the computer. With this signal, the computer will then transmit a read data command, RXOUT*. RXOUT* is fed to both the LS373 at U6 and the LS74 at U9. This term effectively loads the digitized data onto the computer data bus at the same time it resets the Poll Bits flip-flop in preparation for the next conversion cycle.

The next command to arrive from computer 20 will again be RXEN*, and the entire Write/Read conversion and transmission cycle begins again.

The system is driven with software which is stored in ROM 24 which can be manipulated and changed to adjust the system to its environment. This software includes the algorithms necessary to compute the mass, distance, direction and speed of any free body detected by the system, as well as those needed to adjust to transmitter power variations and sense the position of the phased directional antenna system, perform feedback functions, drive the analog-to-digital converter, make decisions concerning free body mass in the planar area covered and generally run the system in an orderly fashion.

Means to detect and define the mass and location of a monitored object using radio waves requires not only the physical components and circuitry being discussed, but also mathematical formulae and computations which can be programmed into a software package and stored in ROM 24.

MRDOT Theory and Equations

Figure 2:
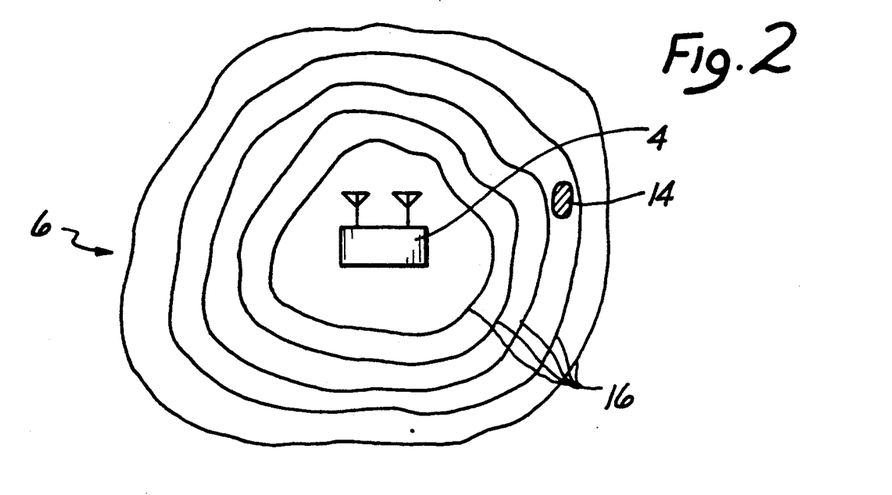
FIG. 2 illustrates an object within a monitored area defined by the standing wave fronts emanating from the transceiver.

Transmitter 2 feeds its signal into antenna 34 such that the plane of the transmitted wave fronts will be at approximately 90 degrees to the each plane of an area to be monitored. Receiving antenna 10 feeds a varying refraction/reflection RF signal from the monitored area to a circuit tuned to the frequency of the transmitter. A detection circuit outputs a DC signal with an AC component whose rate of change and amplitude is a function of the change in the refracted signal from the monitored area 6 as a body 14 traverses the wave fronts 16 of the transmitted standing wave (FIG. 2).

At 915 MHz, the wave length of the transmitted signal is approximately 12.9 inches; therefore, as a given mass 14 traverses every 12.9 inches and crosses a standing wave node (which will be the same polarity of the wave nodes 12.9 inches to either side of it), the DC output signal of receiver detection circuit 12 will rise or fall to an electrically positive or negative peak amplitude depending on the polarity of the node. As mass 14 approaches transceiver 4, each peak of the resulting sine wave, regardless of whether it is positive or negative, will increase in amplitude relative to the peak before it, and will do so in a non-linear fashion (a mass moving away from the transceiver will have the opposite effect). If the peaks of these resulting sine waves (shown in FIG. 5), that is, the return signal, either the positive set or the negative set, are plotted against the distance of mass 14 from transceiver 4, the resultant curve (shown in FIG. 6) is exponential, rising toward infinity as mass 14 gets closer to transceiver 4 and falling toward zero as it moves farther away. Since the curve of the return signal plot is non-linear, and since each different mass in a given transceiver arena will have a separate plot, no two masses will have the same curve relative to the distance and return signal lines, but the curves will be identical in shape and nest into each other, forming a family of curves for all masses detected in monitored area 6. A family of curves for three such masses are shown in FIG. 6. The mathematical formula which expresses this is based on the inverse square law, which states that the energy from the transmitter will be equal to the inverse square of the distance squared (see Equation 1 in FIG. 7).

Since the free mass within the purview of the transceiver will reflect more or less energy, depending on its electromagnetic cross section, or approximately its physical mass, the amount of refracted energy will vary accordingly. Hereinafter, mass shall be interchangeably used to mean electromagnetic cross section. Therefore, the returned energy is given by equation (3) in FIG. 7, when M is the mass of the object and d is the distance between the object and the transceiver.

Figure 5:
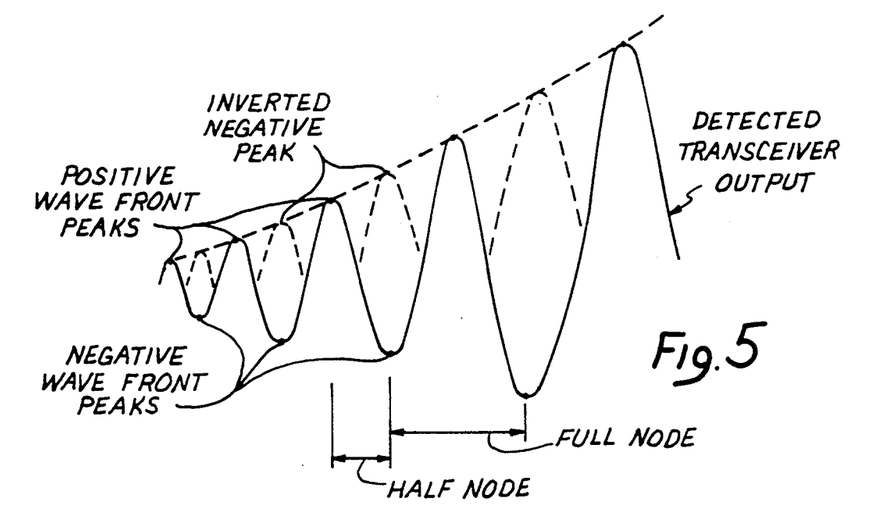
FIG. 5 is a graph representing the detected transceiver output.

Thus, the foregoing formula, depending on the value of M and of d, is the formula for any given mass and will describe the curve for that mass. But the system has available to it only one piece of raw data, R. From this it must derive the size of the mass and the distance from which the mass is refracting the transmitter's energy at any read point. Since the peak read points, R, are at specific reference points relative to the transceiver, that is, along a series of roughly concentric wavefronts or circles created by the standing wave nodes from the transmitter (FIG. 2), the system knows the specific, or fixed distance between these nodal planes, which at 915 MHz, is 12.9 inches. Since these node planes are separated by the distance between the full wave length nodes at that frequency, and since the half-node points are received as a peak of the opposite polarity, it is possible to use half-node points and simply mathematically invert the polarity, thus allowing for a minimum discrimination distance of 6.45 inches for greater accuracy (FIG. 5).

Whether full- or half-nodes are used, another piece of data is available to the system, the node distance, termed U. Since the curve described by the mass against distance is non-linear, no two portions of the curve's length will describe the same arc, or likewise, the same tangent to the curve. It is possible to calculate the tangent to the curve at a given distance for a given set of two readings (FIG. 8). When the system detects a peak, it seeks a second peak. With the second peak it can determine, based on whether the second peak is greater or lesser than the first, whether the refracting mass is moving away from or toward the transceiver. With the formula of Equation (4) of FIG. 7, the approximate tangent to the curve for two close successive readings (FIG. 8) can be determined. It can be readily seen that as the mass approaches the transceiver R1, the first reading, and R2, the second reading, become greater, and the tangent will rise toward infinity and the angle A, the angle between the horizontal and the tangent, will approach 90 degrees. As the mass moves away from the transceiver, the opposite effect will be seen.

With readings R1 and R2, the distance reference U and the tangent of the angle A against the curve described between the two read points, the system has enough information to determine the value of the mass, M, and the actual distance, in multiples of U, and d. If $$M = R d^2,$$ Equation (5)

then, $$M = R1 d_1^2.$$ Equation (6)

and $$M = R2 d_2^2,$$ Equation (7)

since each R reading, R1 and R2 has a corresponding d between the subject mass and the transceiver, $d_1$ and $d_2$, and this formula is equivalent for any point on the subject curve. Therefore, $$R_1 d_1^2 = R_2 d_2^2.$$ (Equation 8)

Figure 7:
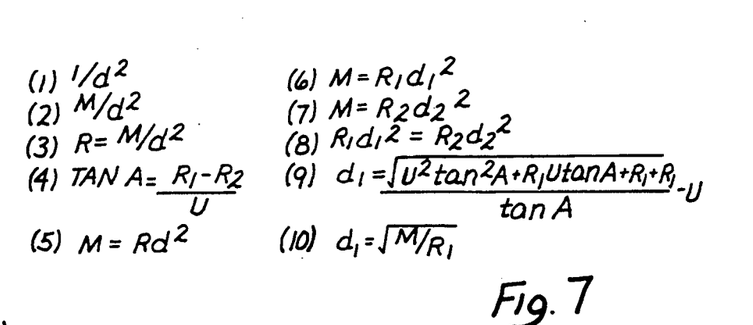
FIG. 7 is a list of algebraic equations used by the system's computer to interpret the received signals.
Figure 8:
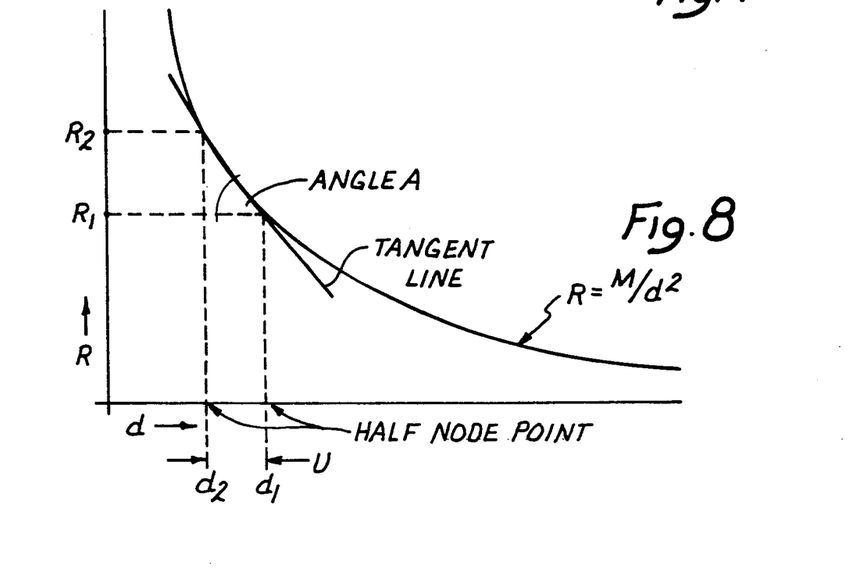
FIG. 8 is a graph plotting the return signal against the distance from transceiver of an object.

This relationship results in a quadratic equation, whose final form reads as equation (9) in FIG. 7. Note the d1 and R1 are used. Whether the first or second read point will be used is dependent upon the direction of movement of the free body direction. By using the equation $$d1 = (M/R1)^{\frac{1}{2}},$$ Equation (10)

the mass can be determined. This solution, however, can be inaccurate when the mass is very close to the transceiver, depending on the precision of the computer, since the difference between the readings becomes exaggerated. This inaccuracy is felt only when the mass is within two or three distance units (U) from the transceiver, and is lessened radically as the mass moves away. This solution is given as an illustration of the principle, but other mathematical solutions are possible, such as those found in differential calculus, for example.

The instructions and the algorithms themselves can and will vary from system to system and can and will change over time, and they can be written in any number of computer software languages, but in essence, each program remains the same by being specific to this system. Such software can be delineated from other software by its purpose.

Power-On and Idle Modes

When power is first applied to the MRDOT system, the crystal clock 26 begins to oscillate. All other circuits in the system are in an unready state. For that reason, a general reset pulse is generated for approximately 100 microseconds. During this period of time, the address counter of CPU 22 is set to 0000, and RAM 20 and all CPU 22 and I/O registers are cleared.

After the termination of the reset pulse, CPU 22 begins operation and sets the initial ROM 24 address on the address bus, 0000. This is the first address in ROM 24, and the start of a system check and test subroutine. CPU 22 has to raise the RAM/NOT ROM line to distinguish between the two memories. This software routine, which like all the routines in ROM 24 has been previously burned in, makes a methodical check of all elements of the system. It checks RAM 20 for operability, checks for the presence of all I/O devices, runs through some elemental CPU exercises, and then goes to the next routine if all is well. If there are any problems during power-on, indications will be made to the operator through the status register on control panel 32.

Assuming that there are no problems, CPU 22 calls up the Idle routine. This routine waits for incoming information from control panel 32, since there is no database upon which to operate the system in Search mode. An indication appears on control panel 32 showing that the check routine has passed and that the system is in the Idle mode. It has taken approximately five seconds or less to accomplish the above.

Figure 12A:
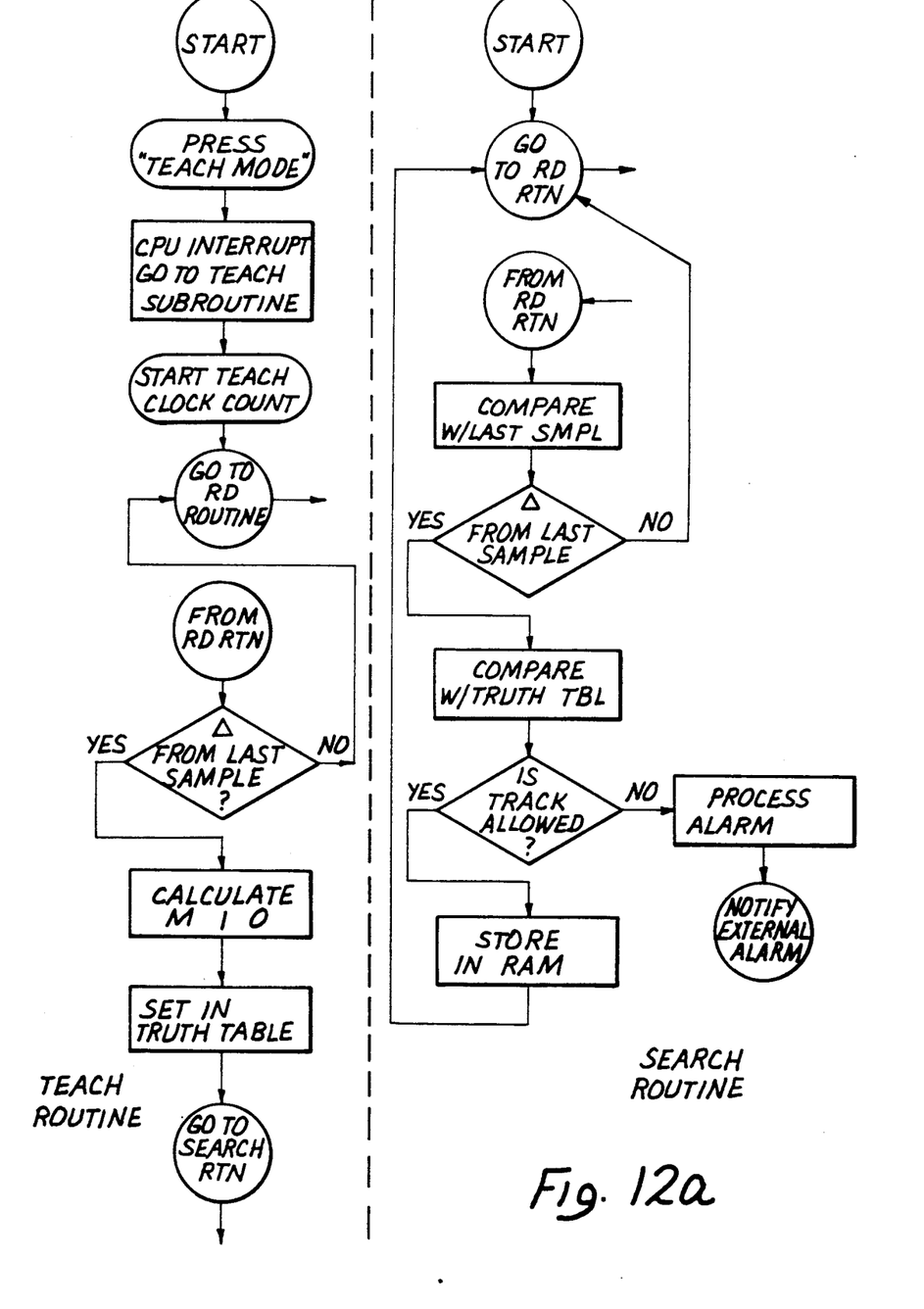
FIGS. 12a and 12b are flow charts indicating the routines used by the computer programs.

Teach Mode (see FIG. 12)

At this juncture the system is waiting for database or fixed information upon which to operate. Since MRDOT uses signature recognition of masses moving in its RF field, it has to know one basic fact, and that is, the signature of a standard mass, such as that of the operator. This signature includes two components, distance from transceiver 4 to the standard mass 14, and the amount of the mass 14, both figured against the power of the transmitter 2 when the signature is taken.

With the Idle indication showing on the operator panel 32, the operator enters a status code into a data pad on control panel 32 and then the Enter button is pressed. This action sends an interrupt to CPU 22 which indicates that control panel 32 has data to transmit. CPU 22 then brings up the I/O control line and places the address of control panel 32 on the address bus. The data in the data output switches is compared with data in ROM 24 by CPU 22, and it signifies that the next data will be body mass. CPU 22 then "calls up" the operator panel 32 via the address and data lines, all under control of ROM 24 program, and informs the operator that it is time to place more data in the data input switches. The operator's body mass is entered into the set of data input switches, and placed on the data bus. CPU 22 then receives the mass data and stores it to RAM 20.

Next, a status code, denoting that the distance of the test mass 14 from transceiver 4, is set into the data pad and the Enter button pressed. The same sequence occurs, and that data is sent to RAM 20 by CPU 22 under control of the ROM 24 software.

The foregoing action triggers CPU 22 to vector the address of ROM 24 to another subroutine area for a pseudo-Search. During this operation the system will "look" at the moving mass 14 of the operator and run a mass-distance calculation on it, except that the mass and distance data will be provided from RAM 20 sent previously by the operator. This action will take place in a couple of seconds, enough time to run the calculation several thousand times.

First, the subroutine in ROM 24 instructs CPU 22 to begin phasing the transmitting antenna 34. This is accomplished by loading a register in CPU 22 with the beginning phase count, beginning with zero. The I/O control line is raised, the address of the phase placed on the address bus, and the data is set onto the data bus and clocked into phaser circuit 8. This data is translated by the phaser 8 to an analog signal which biases the phase angle of the sine wave of the 930 Mhz radio wave emanating from the transmitter 2 in such a way as to aim the radio beam in a stepped series of discrete, narrow, petal-shaped lobes 36 through 360 degrees.

Next, the routine in ROM 24 instructs CPU 22 to address the power sample digitizer. This is accomplished by CPU 22 and the system in the same way as previously described for other I/O devices. The output power of the transmitter 2 is sensed in the power sample 28 circuit which outputs a smoothed analog signal. This signal is converted by digitizer 18 to digital data. When digitizer 18 is addressed by CPU 22, this data is placed on the data bus, coupled to CPU 22 and into a register. From there is it sent to RAM 20, again by raising the RAM/NOT ROM line, in the same way as discussed above for RAM/ROM operations.

The next step is to read the output of receiver 12. Receiver 12 is a continuously operating analog device, "listening" to the reflections and refractions from objects in the purview of the transmitter RF field 6. Signals from the receiver antenna 10 are coupled through a preamplifier, thence to an amplifier where they are smoothed and sent to digitizer 18. Digitizer 18 converts the analog stream to digital data. At read time, the address of digitizer 18 is raised by CPU 22 and the data is placed on the data bus. However, since the operator's mass 14 may not have been crossed by the effectively rotating beam 36 of the transmitter 2, there may be virtually no change in output until such time as beam 36 crosses the operator mass 14. Assuming, though, that beam 36 has crossed the operator mass 14, this data is placed on the data bus, sent to a CPU register and on to RAM 20 location.

This ROM software routine continues until the next receiver read time by changing the phase of transmitter 2, sampling the transmitter 2 power output, then reading the receiver 12, until the next operator mass 14 read data is in digitizer 18. CPU 22 "knows" to not pay any attention to other signals coming into receiver 12 because it is tracking the phase angle at all times. When the first operator mass 14 data arrives, it logs the phase angle into a RAM table for future reference, and compares each new stepped phase angle with the angle of the transmitter beam 36 on the first read.

When the next receiver read data arrives and it matches logically—within one or two phase angle counts—the last read phase angle, CPU 22 vectors ROM 24 to a subroutine for calculating mass and distance. Using the ROM software, CPU 22 subtracts the lower read data value form the higher and calculates the tangent to the signature curve of the mass 14. Since computer 20 always needs at least one "known" value, it assumes that the mass is moving at an instantaneous speed of 60 mph. With this figure, it can calculate the mass and "macro" distance, except in this special case the mass and distance has been given by the operator. Therefore, the data garnered earlier from control panel 32 is plugged into the equation, and the signature for that mass 14 at the given distance and for the transmitter power at the instant of read is logged into RAM 20. This fixed signature establishes equation factors which will be figured into all future calculations to determine mass and distance during Search mode. In other words, the system comes up with raw numbers in each series of computations which are only relative, but which in the Teach mode gives computer 20 absolute numbers so that it can relate to the "alarm/no-alarm" parameters which will be entered later for realistic Search mode operation.

Next, the real clock time is entered. This is accomplished in the same manner, from control pane 32, using a status code and the Enter button. The clock time is set into the data pad after the system notifies the operator that it is ready. The real time clock is part of the system of "alarm/no-alarm" parameters which determine whether an alarm notification is to be made or not.

Teach mode will also expect day-of-the-week information, which is entered into the system in a manner as described above.

It is also necessary in Teach mode to store the perimeter, or boundary line of area 6 or structure to be covered by the system. In the same manner, a status code, telling the system of the intent to store perimeter values, is set into the data pad, analyzed by the system as such, and then the values can be entered in two different ways.

One way of entering perimeter values is to instruct the system, via status code, that a given test mass will "walk" the perimeter, and that the distance for the mass in each transmitter phase is to be remembered as a perimeter value. In this way, the outline of the structure or area is "traced" into memory in a point-by-point fashion. The other is to "key" in the values against phase points which are also keyed in, and have the system "draw" the lines. These two methods are necessary since some structures have exterior walls which bar the transmittal of the MRDOT RF field, or where it is difficult to physically "walk" the perimeter of a structure.

These perimeter values are stored in RAM 20 and become "alarm/no-alarm" points during Search mode operations when used against real time clock information.

Further information is stored under Teach mode in the way of external lock codes, "alarm/no-alarm" times of day for system users, changes in mass parameters, and so on.

An example might be where the system is used in a residence. Assume that there are five humans, a cat, a dog and a canary living the house. In Teach mode the system learns the acceptable mass for all the normal occupants. Naturally, anything of less mass than the cat and within the established boundaries of the residence would be thrown out as no threat, although it can be readily seen that the system could warn of the intrusion of rodents or other unwanted small visitors. The "alarm" parameter at the low end mass might be, say, seventy-five pounds for an extraneous mass for a child or a good-sized dog. The clock time parameter might be 10:00 p.m. Then anything over the seventy-five pound trigger mass after 10:00 o'clock at night would call for the system to notify the proprietor. This, of course, excludes those humans over seventy five pounds which have been defined by the system as allowable and normal. Obviously the variations on this theme are endless.

One additional comment on Teach mode needs to be made. Since the system will be on a battery backup system, the likelihood of a total, and therefore disastrous, power failure is low. However, in the unlikely event that both main A/C power and battery power should fail, then the entire system would "go down", and once power was restored, all the above entries would have to be remade.

Figure 12B:
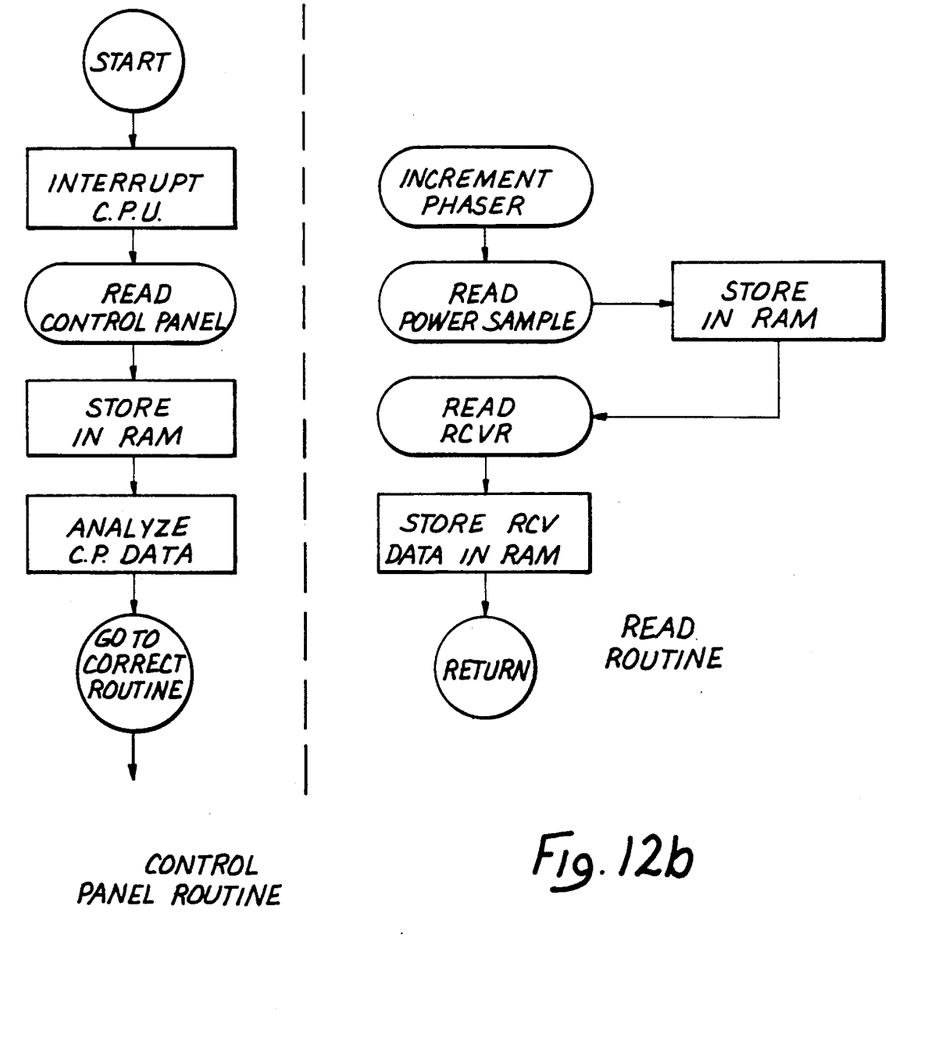

Search Mode (see FIG. 12b)

Search mode is the normal or operating mode for MRDOT. During this mode, which presumably is twenty-four hours a day, the software resident in ROM 24 with special parameters in RAM 20 dictate to the system how to operate with the information which it takes in from transceiver 4.

We will reiterate the three-step routine for data gathering here only in a general fashion. Remember that the ROM software tells CPU 22 and the system to "bump" the phase angle, sample the transmitter power, then read the receiver data. Every time this happens, RAM 20 is searched for previous data gathered in or close to that phase angle. When there is previous data, the tangent is calculated, the mass and the distance calculated, all with reference to the factors set in during Teach mode. Third and fourth derivatives are available, those of speed and direction. Thus, it can be seen that a "plot" is possible, and information could be converted for use on a CRT. Direction is important, but speed in most cases is only incidental to the problem.

When the plot point with all the attendant data is collated, the "truth" table, information on boundary parameters, real time clock, allowable mass, and so on, is searched in RAM 24 by CPU 22 under guidance from the ROM software. If all factors involved are negative, that is there is a "no-alarm", then the system simply continues in Search mode. Should the factors be right or a positive, or "alarm", then a special software subroutine is called up which gets information on what course of action is to be taken, again, software driven data partially derived from information provided through the control panel. Normally, CPU 22, under control of the ROM 24 routine, will call up I/O circuitry 30 and set up external "hard" drive lines with data for transmittal to remote sounders or response systems. One example is a telephone line. Another is an RS-232 interface to a modem or video output capable of showing plot points with mass and direction indications on the screen.

Many modifications and alterations may be made by those having ordinary skill in the art without departing from the spirit and scope of the invention. Therefore, the illustrated embodiment should not be read to limit the invention which is defined by the following claims.

I claim:

1. A security system for automatically determining that an unauthorized intruder has entered a monitored area comprising:

template forming means for forming a reference template of normal ambient digital signals representing the position of all stationary objects predetermined to be normal within said area and further containing allowable body digital signals representing the electromagnetic signature of each of a plurality of moving bodies predetermined to be allowable within said area;

a transmitter having an output antenna adapted to transmit energy into said monitored area;

a receiver having an input adapted to receive said energy transmitted into said area by said transmitter as reflected from objects within said area and further having an output;

signal processing means having an output and an input, said input coupled to said receiver output, said signal processing means for processing said received energy into current digital signals representing the current position of all stationary objects within said area and of any moving body within said monitored area;

signal comparison means having an input and an output, said input coupled to said template forming means and to said output of said signal processing means for comparing the normal ambient digital signals and the allowable body digital signals contained in said template with the current digital signals processed in said signal processing means; and an output indicator means connected to the output of said signal comparison means for indicating to a user of said system that an unauthorized intruder is in said monitored area if said comparisons are not within predetermined parameters.

2. The system of claim 1 wherein said signal processing means comprise:

conversion means for converting said reflected energy into digital signals representing the amplitude of said reflected energy;

temporary RAM storage means connected to said conversion means for temporarily storing said amplitude digital signals;

ROM storage means for storing a program capable of processing said amplitude digital signals to calculate the position of all stationary objects and of a moving object in said area; and a central processing means connected to said ROM means and to said RAM means adapted to run said program stored in said ROM means using the amplitude digital signals from said RAM means whereby said current digital signals are created.

3. The system of claim 2 wherein said template forming means is coupled to said signal processing means, and said reference template is automatically formed by said signal processing means when said unit accesses a training portion of said program upon initiation by a user of said system.

4. The system of claim 3 wherein said template forming means further comprises a control panel which allows a user of said system to manually add allowable body digital signals to said template, said allowable body digital signals representing an allowable body.

5. The system of claim 4 wherein said control panel allows a user to manually subtract allowable body digital signals from said template.

6. The system of claim 5 wherein said system is programmable to add certain allowable body digital signals from said template on a predetermined temporal basis.

7. The system of claim 6 wherein said system is programmable to subtract certain allowable body digital signals from said template on a predetermined temporal basis.

8. The security system of claim 7 further comprising:

signal biasing means connected to said transmitter for effectively biasing a narrowly focused beam of said energy through an arc of 360 degrees in a predetermined plurality of discrete steps.

9. The security system of claim 8 wherein said energy are electromagnetic waves.

10. The security system of claim 9 wherein said transmitter comprises:

a single ended dipole antenna;
a high frequency oscillator; and
a feeder circuit.

11. The security system of claim 10 further comprising:

an alarm system connected to the output of said signal comparison means for alerting a user of said system that an unauthorized intruder is in said monitored area if said comparisons are not within predetermined parameters.

12. The security system of claim 11 further comprising:

input data means coupled to a plurality of sensory devices and to said signal processing means for creating a plurality of digital input data signals representing sensory information relating to said body and for sending said input data signals to said RAM storage means for temporary storage, whereby a separate set of said temporarily stored input data signals is used with a corresponding set of said digital signals within said template forming means and within said signal processing means for allowing said signal comparison means to consider additional identifiable characteristics of said body in determining whether said body is unauthorized.

13. A system for automatically determining an identifying mass-related characteristic of a body moving in any direction within a monitored area including a plurality of objects therein, said monitored area being electrode free, comprising:

a radio frequency transmitter having an output antenna adapted to transmit discrete pulses of energy signals into said monitored area;

a radio frequency receiver having an input adapted to receive energy transmitted into said area as reflected from said objects and said body within said area and further having an output; and signal processing means having an input coupled to said receiver output for processing said received reflected radio frequency energy into digital signals representing the reflective radio frequency cross section of said body, said reflective radio frequency cross section being an identifying mass-related characteristic of said body.

14. A system for automatically comparing an identifying mass-related characteristic of a body moving in any direction within a monitored area with a predetermined set of allowable characteristics, said area including a plurality of objects therein, comprising:

template forming means for forming a reference template containing digital signals representing the cross-sectional area of said objects predetermined to be allowable;

a transmitter having an output antenna adapted to transmit discrete pulses of energy signals into said monitored area;

a receiver having an input adapted to receive energy transmitted into said area as reflected from objects and said body within said area and further having an output;

signal processing means having an output and an input, said input coupled to said receiver output for processing said received energy into current digital signals representing the electromagnetic cross sectional area of said body, said cross-sectional area being an identifying mass-related characteristic of said body;

signal comparison means having an input and an output, said input coupled to said template forming means and to said output of said signal processing means for comparing the digital signals representing the electromagnetic cross-sectional area of said allowable object with the digital signals representing the electromagnetic cross-sectional area of said body; and an output indicator means connected to the output of said signal comparison means for indicating to a user of said system the results of said comparison.

15. A method of automatically determining that an unauthorized intruder has entered a monitored area comprising the steps of:

forming a reference template containing normal ambient digital signals representing the position of all stationary objects predetermined to be normal within said area, and further containing allowable body digital signals representing the electromagnetic cross sectional area of each of a plurality of moving bodies predetermined to be allowable within said area;

transmitting energy into said monitored area;

receiving said energy transmitted into said area as reflected from objects and bodies within said area;

processing said received energy into current digital signals representing the current position of all stationary objects within said area and the electromagnetic cross sectional area of any moving body within said monitored area;

comparing the normal ambient digital signals and the allowable body digital signals contained in said template with the processed current digital signals; and indicating to a user that an unauthorized intruder is in said monitored area if said comparisons are not within predetermined parameters.

16. The method of claim 15 wherein said step of processing comprises:

converting said reflected energy into digital signals representing the amplitude of said reflected energy;

temporarily storing said digitized reflected signals;

storing a computer program capable of processing said digitized reflected signals to calculate the ambient position of all stationary objects and the electromagnetic cross-sectional area of a moving object in said area; and generating said current digital signals by means of said stored program using the temporarily stored digitized reflected signals.

17. The method of claim 16 wherein said step of receiving comprises:

receiving a first set of digitized reflected signals correlating to energy reflected from said body, said first set of signals representing the measured electromagnetic cross-section of said body at a first time, and further receiving subsequent sets of amplitude signals correlating to energy reflected from said body, said subsequent sets of signals representing the measured electromagnetic cross-section of said body at subsequent times;

determining the location of said body with said program using said first and subsequent sets of signals by assuming a predetermined relationship of said the magnitude signals relative to the distance of said body given a constant electromagnetic cross section for said body; and determining the electromagnetic cross-sectional area of said body with said program using said electromagnetic cross section and distance equations.

18. The method of claim 17 wherein said template is automatically formed from said steps of transmitting, receiving, and processing by initiating a training portion of said program.

19. The method of claim 18 further comprising:

manually adding allowable body digital signals to said template, said allowable body digital signals representing an allowable body.

20. The method of claim 19 further comprising:

manually deleting allowable body digital signals to said template, said allowable body digital signals representing an unauthorized body.

* * * * *